(12) United States Patent
Noh et al.

(10) Patent No.: US 10,904,834 B1
(45) Date of Patent: Jan. 26, 2021

(54) POWER SAVING FOR BEACON DETECTION

(71) Applicant: NEWRACOM, INC., Lake Forest, CA (US)

(72) Inventors: Yujin Noh, Irvine, CA (US); Young Hoon Kwon, Laguna Niguel, CA (US); Seung Ho Choo, Irvine, CA (US); Hyungu Park, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 15/977,999

(22) Filed: May 11, 2018

Related U.S. Application Data

(60) Provisional application No. 62/509,643, filed on May 22, 2017.

(51) Int. Cl.
*H04W 52/02* (2009.01)
*H04W 76/28* (2018.01)
*H04W 72/12* (2009.01)
*H04W 28/02* (2009.01)
*H04W 84/12* (2009.01)

(52) U.S. Cl.
CPC ... *H04W 52/0229* (2013.01); *H04W 28/0278* (2013.01); *H04W 72/1205* (2013.01); *H04W 76/28* (2018.02); *H04W 84/12* (2013.01)

(58) Field of Classification Search
CPC ......... H04W 52/0229; H04W 28/0278; H04W 76/28; H04W 72/1205; H04W 84/12
See application file for complete search history.

(56) References Cited

U.S. PATENT DOCUMENTS

| | | | |
|---|---|---|---|
| 2014/0313966 A1* | 10/2014 | Shukla | H04W 48/10 370/312 |
| 2015/0223163 A1* | 8/2015 | Sammour | H04W 4/08 370/311 |
| 2016/0113034 A1* | 4/2016 | Seok | H04W 74/04 370/329 |

(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Lakeram Jangbahadur

(57) ABSTRACT

A wireless device comprises receives, using a receiver of the wireless device, a first part of a frame and determines, using the first part of the frame, whether the frame is a frame of interest. When the frame is a frame of interest, the device receives a second part of the frame that occurs after the first part and includes a first information, and determines whether the first information indicates a first state. In response to determining that the first information indicates the first state, the wireless device enters a sleep state without receiving a third part of the frame that occurs after the second part. Determining whether a frame is a frame of interest may include determining that the frame is, for example, a Beacon frame intended for the wireless device and transmitted by another device in the same Basic Service Set as the wireless device.

19 Claims, 9 Drawing Sheets

(56) References Cited

U.S. PATENT DOCUMENTS

| | | | | |
|---|---|---|---|---|
| 2017/0289987 A1* | 10/2017 | Seok | ............... | H04W 72/0406 |
| 2018/0077723 A1* | 3/2018 | Adachi | ............... | H04L 12/189 |
| 2018/0123758 A1* | 5/2018 | Lee | ............... | H04L 5/0051 |
| 2018/0176865 A1* | 6/2018 | Kim | ............... | H04W 52/0235 |
| 2018/0279209 A1* | 9/2018 | Fang | ............... | H04W 48/12 |
| 2018/0310247 A1* | 10/2018 | Chu | ............... | H04W 52/0235 |

OTHER PUBLICATIONS

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

\* cited by examiner

POWER SAVING FOR BEACON DETECTION

CROSS-REFERENCE TO RELATED APPLICATION

This application claims the benefit of U.S. Provisional Patent Application No. 62/509,643, filed May 22, 2017, which is incorporated by reference herein in its entirety.

BACKGROUND

1. Technical Field

The technology described herein relates generally to wireless networking. More particularly, the technology relates to control of power saving modes in stations connected to a wireless network.

2. Description of the Related Art

Wireless Local Area Network (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. With the increase in the range applications to which wireless devices are being put, WLAN users desire improved performance in delivering their applications, including improved power consumption for battery-operated devices, such as battery-operated "Internet of Things" (IoT) devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

A wireless devices may use one or more sleep states to reduce average power consumption over time, such as to improve the amount of time that the wireless device can operate on battery power. How the devices determines when to go into the one or more sleep states and when to come out of the one or more sleep states can have a substantial effect on the average power consumption.

SUMMARY

In an embodiment, a method performed by a wireless device comprises receiving, using a receiver of the wireless device, a first part of a frame and determining, using the first part of the frame, whether the frame is a frame of interest. In response to determining that the frame is a frame of interest, a second part of the frame is received, the second part occurring after the first part and including a first information. The method further comprises determining whether the first information indicates a first state, and in response to determining that the first information indicates the first state, placing the wireless device in a sleep state without receiving a third part of the frame. The third part occurs after the second part.

In an embodiment, determining that the frame is a frame of interest comprises determining, using a frame control field included in the first part, whether the frame is a frame of a first type; determining, using a Basic Service Set Identifier included in the first part, whether the frame was transmitted by a device in a same Basic Service Set as the wireless device; and determining, using an address included in the first part, whether the frame is intended for the wireless device. The frame is a frame of interest when the frame is a frame of the first type, the frame was transmitted by a device in a same BSS as the wireless device, and the frame is intended for the wireless device.

In an embodiment, the first type is a Beacon frame.

In an embodiment, the first type is a Beacon frame including a Delivery Traffic Indication Map.

In an embodiment, the frame is intended for the wireless device when the address included in the first part corresponds to an address of the wireless device or the address included in the first part indicates a group of wireless devices, and the group of wireless devices includes the wireless device.

In an embodiment, the first information is a Traffic Information Map, and determining whether the first information indicates the first state comprises determining whether the first information indicates that a device that transmitted the frame has traffic buffered for the wireless device and determining that the first information indicates the first state in response to determining that the first information indicates that the device that transmitted the frame does not have traffic buffered for the wireless device.

In an embodiment, placing the wireless device in the sleep state comprises determining an expected time of a transmission of a subsequent frame of the first type; configuring, according to the expected time, the wireless device to wake up before the expected time; and placing the wireless device in the sleep state.

In an embodiment, the frame is a first frame, and the method further comprises: in response to determining that the first frame is a frame of interest and determining that the first information does not indicate the first state, receiving the rest of the first frame, receiving a second frame transmitted after the first frame, and placing the wireless device in the sleep state in response to completing the reception of the second frame.

In an embodiment, the sleep state is a first sleep state and the frame is a first frame, and the method further comprises: in response to determining that the first frame is a frame of interest and determining that the first information does not indicate the first state, determining an end time of the first frame, placing the wireless device in a second sleep state without receiving a third part of the frame and configuring, according to the end time, the wireless device to wake up at a time corresponding to the end time, receiving a second frame transmitted after the first frame; and placing the wireless device in the first sleep state in response to completing the reception of the second frame.

In an embodiment, the first information includes a timestamp, and the method further comprises: in response to determining that the first frame is a frame of interest, determining a timing drift according to the timestamp, determining that the first information indicates the first state in response to a value of the timing drift having a magnitude less than a predetermined threshold value, and in response to determining that first information does not indicate the first state, updating a clock of the wireless device according to the timing drift and placing the wireless device in the sleep state without receiving the third part of the frame.

In an embodiment, the method further comprises determining, using the first part of the frame, whether the frame is a frame of a first type, incrementing a counter in response to determining that the frame is the frame of the first type, and determining whether the value of the counter modulo N corresponds to a predetermined constant, where N is a predetermined number. Determining whether the frame is the frame of interest comprises determining that the frame is the frame of interest when the frame is the frame of the first type and the value of the counter modulo N does not correspond to the predetermined constant, determining that the frame is not the frame of interest in response to the frame not being the frame of the first type, and determining that the frame is not the frame of interest in response to the value of counter modulo N corresponding to the predetermined constant.

In an embodiment, the method further comprises determining, using the first part of the frame, a length of the frame, producing, using the length of the frame and a previously-stored length, an indication of whether the length of the frame is equal to the previously-stored length, and updating the previously-stored length to be equal to the length of the frame after producing the indication. Determining whether the frame is the frame of interest comprises determining that the frame is the frame of interest when the frame is the frame of the first type, the value of the counter modulo N does not correspond to the predetermined constant, and the indication indicates that the length of the frame was equal to the previously-stored length, and determining that the frame is the not frame of interest in response to the indication indicates that length of the frame was not equal to the previously-stored length.

In an embodiment, a wireless device comprises a receiver and a processor. The processor is configured to receive, using the receiver, a first part of a frame, and determine, using the first part of the frame, whether the frame is a frame of interest. The processor is further configured to, in response to determining that the frame is a frame of interest: receive a second part of the frame, the second part occurring after the first part and including a first information; determine whether the first information indicates a first state, and in response to determining that the first information indicates the first state, place the wireless device in a sleep state without receiving a third part of the frame. The third part occurs after the second part.

In an embodiment, the processor being configured to determine that the frame is a frame of interest includes the processor being configured to determine, using a frame control field included in the first part, whether the frame is a frame of a first type, determine, using a Basic Service Set Identifier included in the first part, whether the frame was transmitted by a device in a same Basic Service Set as the wireless device, and determine, using an address included in the first part, whether the frame is intended for the wireless device. The frame is a frame of interest when the frame is a frame of the first type, the frame was transmitted by a device in a same BSS as the wireless device, and the frame is intended for the wireless device.

In an embodiment, the first type is a Beacon frame.

In an embodiment, the processor being configured to place the wireless device in the sleep state includes the processor being configured to determine an expected time of a transmission of a subsequent frame of the first type, configure, according to the expected time, the wireless device to wake up before the expected time, and place the wireless device in the sleep state.

In an embodiment, the frame is a first frame, and the processor is further configured to: in response to determining that the first frame is a frame of interest and determining that the first information does not indicate the first state, receive the rest of the first frame, receive a second frame transmitted after the first frame, and place the wireless device in the sleep state in response to completing the reception of the second frame.

In an embodiment, the frame is a first frame and the sleep state is a first sleep state, and the processor is further configured to: in response to determining that the first frame is a frame of interest and determining that the first information does not indicate the first state, determine an end time of the first frame, place the wireless device in a second sleep state without receiving a third part of the frame and configure, according to the end time, the wireless device to wake up at a time corresponding to the end time, receive a second frame transmitted after the first frame, and place the wireless device in the first sleep state in response to completing the reception of the second frame.

In an embodiment, the processor is further configured to: determine, using the first part of the frame, whether the frame is a frame of a first type, increment a counter in response to determining the that frame is the frame of the first type, and determine whether the value of the counter modulo N corresponds to a predetermined constant, where N is a predetermined number. Determining whether the frame is the frame of interest comprises determining that the frame is the frame of interest when the frame is the frame of the first type and the value of the counter modulo N does not correspond to the predetermined constant, determining that the frame is not the frame of interest in response to the frame not being the frame of the first type, and determining that the frame is not the frame of interest in response to the value of counter modulo N corresponding to the predetermined constant.

In an embodiment, the processor is further configured to determine, using the first part of the frame, a length of the frame, produce, using the length of the frame and a previously-stored length, an indication of whether the length of the frame is equal to the previously-stored length, and update the previously-stored length to be equal to the length of the frame after producing the indication. Determining whether the frame is the frame of interest comprises determining that the frame is the frame of interest when the frame is the frame of the first type, the value of the counter modulo N does not correspond to the predetermined constant, and the indication indicates that length of the frame was equal to the previously-stored length, and determining that the frame is the not frame of interest in response to the indication indicates that length of the frame was not equal to the previously-stored length.

DETAILED DESCRIPTION

Figure 1:
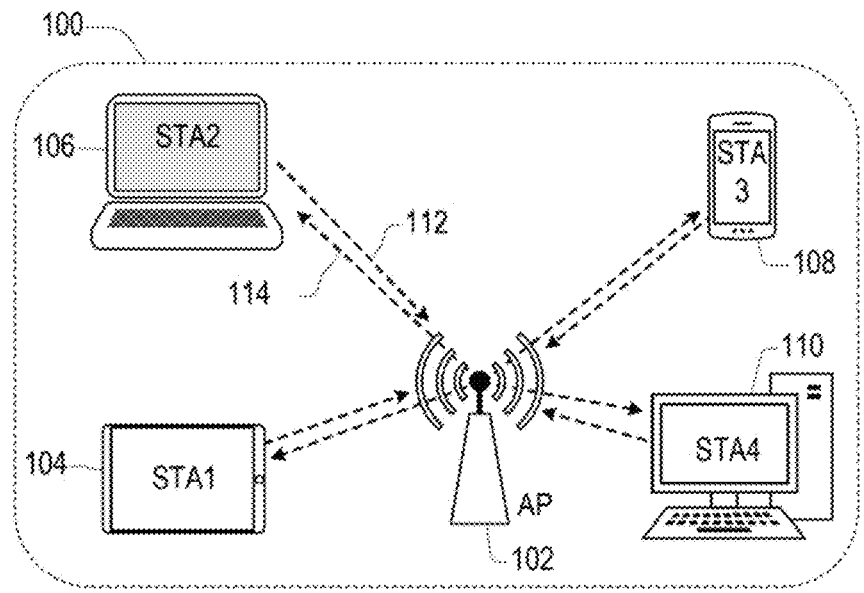
FIG. 1 illustrates a wireless network, according to an embodiment.

The technology described herein relates generally to wireless networking. More particularly, the technology relates to reducing power consumption associated with the processing of periodically transmitted frames such as Beacon frames.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless networks includes an infrastructure Basic Service Set (BSS) 100 of a Wireless Local Area Networks (WLAN). In an 802.11 WLAN, the BSS provides the basic organizational unit and typically includes an Access Point (AP) and one or more associated stations (STAs).

The first BSS 100 includes an Access Point 102 (also referred to as AP) wirelessly communicating with first, second, third, and fourth wireless devices (or stations) 104, 106, 108, and 110 (also referred to as stations STA1, STA2, STA3, and STA4, respectively). The wireless devices may each include a medium access control (MAC) layer and a physical (PHY) layer according to an IEEE 802.11 standard.

Although FIG. 1 shows the first BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the first BSS 100 using a single frame, or may simultaneously transmit information to two or more of the stations STA1 to STA4 in the first BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame, an UL MU-MIMO frame, or an UL MU-MIMO OFDMA frame.

In another embodiment, the AP 102 may be absent and the stations STA1 to STA4 may be in an ad-hoc network.

FIG. 1 shows a first Down-Link (DL) transmission 114 and a first Up-Link (UL) transmission 112 of the first BSS 100. The first DL transmission may include a Beacon frame to be processed by a STA according to an embodiment.

Each of the stations STA1 to STA4 and the AP 102 includes a processor and one or more transceiver circuits, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA4 and the AP 102 may be respectively implemented using hardware components, software components, or both.

The first AP 102 may be or include a WLAN router, a stand-alone Access Point, a WLAN bridge, a Light-Weight Access Point (LWAP) managed by a WLAN controller, and the like. In addition, a device such as a personal computer, tablet computer, or cellular phone may configured to be able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and/or a subtype field included in a control field of the frame, as prescribed in the applicable standard.

Figure 2:
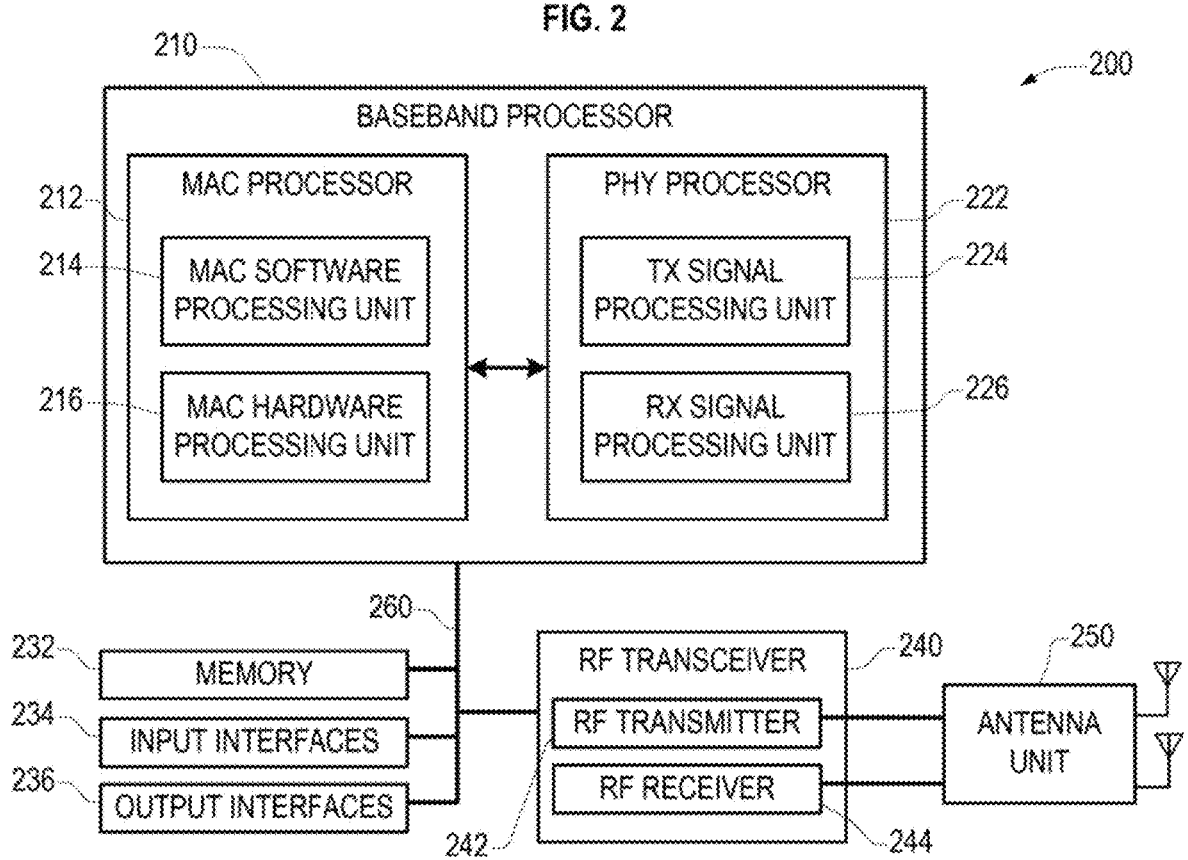
FIG. 2 is a schematic diagram of a wireless device, according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
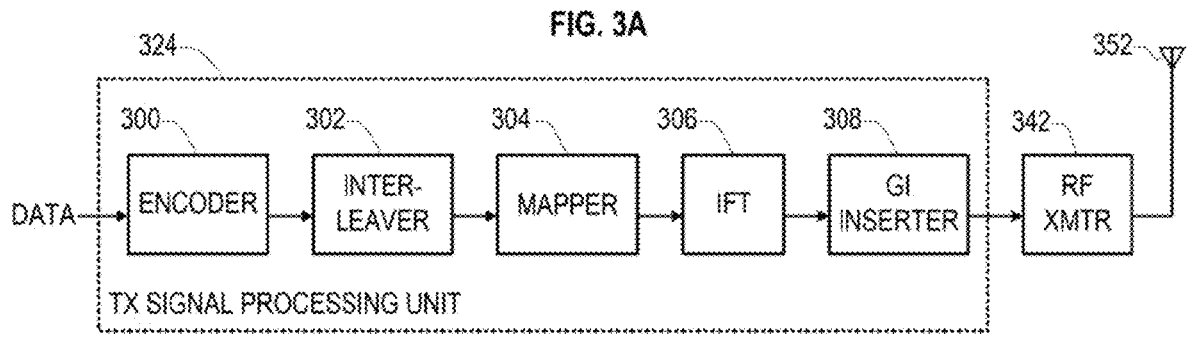
FIG. 3A illustrates components of a wireless device configured to transmit information, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
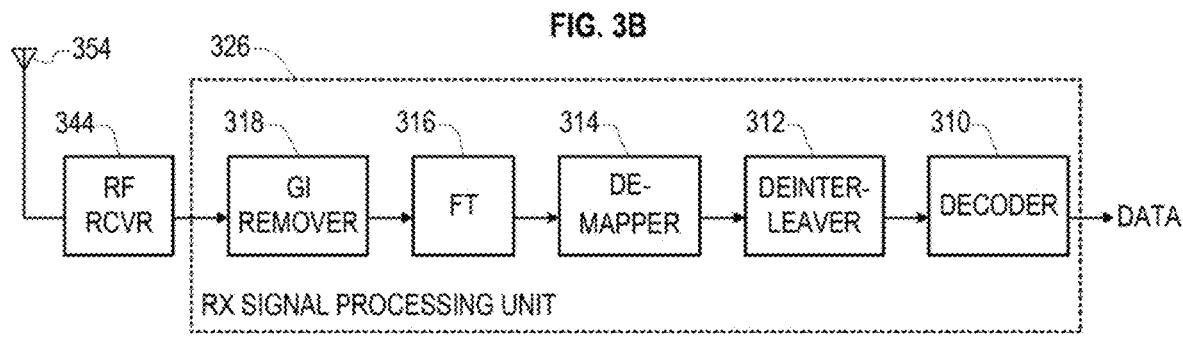
FIG. 3B illustrates components of a wireless device configured to receive information, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
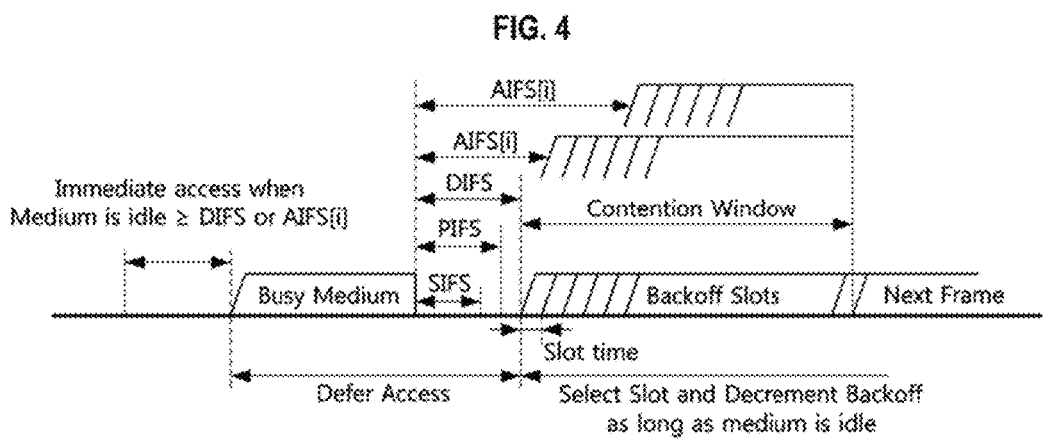
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer.

Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
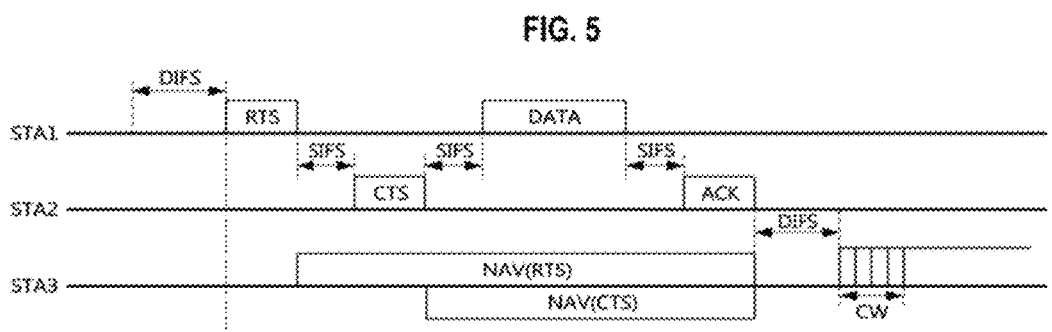
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+ SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA2 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define fields denoted as Legacy Signal (L-SIG), Signal A (SIG-A), and Signal B (SIG-B) within which some necessary information about PHY Service Data Unit (PSDU) attributes are communicated. For example, a High Efficiency (HE) PHY entity may define an L-SIG field, an HE Signal A (HE-SIG-A) field, and an HE Signal B (HE-SIG-B) field.

The descriptions below, for sake of completeness and brevity, refer to OFDM-based IEEE Std 802.11 technology.

A Beacon frame is a management frame that carries regulatory, capability and BSS management information. An AP broadcasts the Beacon frame periodically to communicate with STAs either trying to connect the network or which are already associated to a BSS of the AP. The Beacon frame are scheduled periodically at a Target Beacon Transmit Time (TBTT), which is typically 102.4 ms.

Figure 6:
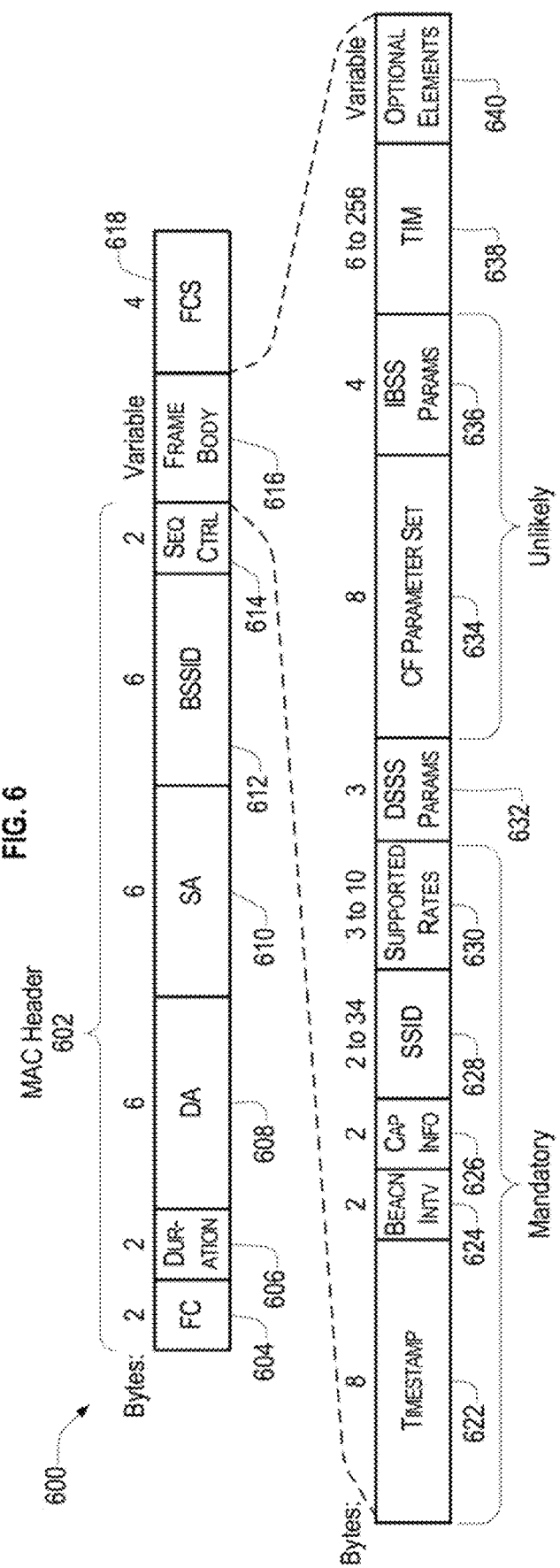
FIG. 6 illustrates a format of a Beacon frame according to an embodiment.

FIG. 6 illustrates a format of a Beacon frame 600 according to an embodiment. The Beacon frame 600 includes a MAC Header 602 including 24 bytes, a frame body 616 including a variable number of bytes, and a Frame Check Sequence (FCS) 618 including four bytes. The MAC header 602 corresponds to a first part of the Beacon frame 600.

The MAC header 602 includes a Frame Control (FC) field 604, a Duration field 606, a Destination Address field 608, a Source Address field 610, a Basic Service Set Identifier (BSSID) field 612, and a Sequence Control field 614. The FC field 604 is set to value that indicates that the frame is a Beacon frame, in which second through sixth bits are set to 0 and a seventh bit is set to 1, pursuant to the IEEE Stds 802.11. The Duration field 606 includes an indication of the duration of the Beacon frame 600.

The frame body 616 of the Beacon frame 600 includes a Timestamp element 622, a Beacon Interval element 624, a Capability element 626, a Service Set Identifier (SSID) element 628, a Supported Rates element 630, and a Direct-Sequence Spread-Spectrum (DSSS) Parameter Set element 632. When the Beacon frame 600 is transmitted by an AP or a Mesh STA, the frame body 616 may further includes a Traffic Indication Map (TIM) element 638. Optionally, the frame body 616 includes one or more of a Coordination Function (CF) Parameter Set element 634, an Independent BSS (IBSS) Parameter Set 636.

Finally, the frame body 616 may include one or more Optional Elements 640 after the TIM element 638. These Optional Elements 640 may include one or more of 45 optional elements defined in the IEEE Std 802.11-2012, optional elements defined in amendments to the IEEE Std 802.11, optional vendor-specific elements, and the like.

The Timestamp element 622 is a value representing the time on the AP, which is the number of microseconds the AP has been active. When timestamp reach its maximum value ($2^{64}$ microsecond or approximately 580,000 years) it will reset to 0. This field is included in all Beacon frames and in Probe Response frames.

The Beacon Interval element 624 indicates the number of time units (TUs) between TBTTs. The Capability information element 626 includes a plurality of subfields that are used to indicate requested or advertised optional capabilities. The SSID element 628 is present in all Beacon frames, probe request frames, probe response frames, association request frames & re-association request frames, and includes a maximum of 32 characters to identify an Extended Service Set (ESS) or IBSS.

The Supported Rates element 630 includes a plurality of octets each describing a single supported rate, including whether the supported rate is "basic (mandatory) rate or mandatory" or "a supported rate" and an indication of the data rate value in units of 500 kbps.

DSSS Parameter Set element 632 contains information to allow channel number identification for STAs. The optional CF Parameter Set element 634 contains a set of parameters necessary to support of a Point Coordination Function (PCF), which is obsolete and unlikely to be implemented. The IBSS Parameter Set element 636 contains a set of parameters necessary to support an Independent BSS (IBSS) of an ad-hoc network.

The TIM element 638 is present only within Beacon frames generated by APs or by mesh STAs in an IBSS. The TIM element 638 includes information that can be useful to STAs in power save mode. The TIM element 638 may be a normal TIM for signaling the presence of buffered unicast traffic for STAs, or a Delivery Traffic Indication Map (DTIM) which informs the STAs about the presence of buffered multicast/broadcast traffic on the AP. A DTIM is not present in all Beacon frames and not present in all TIM elements 638.

Figure 7:
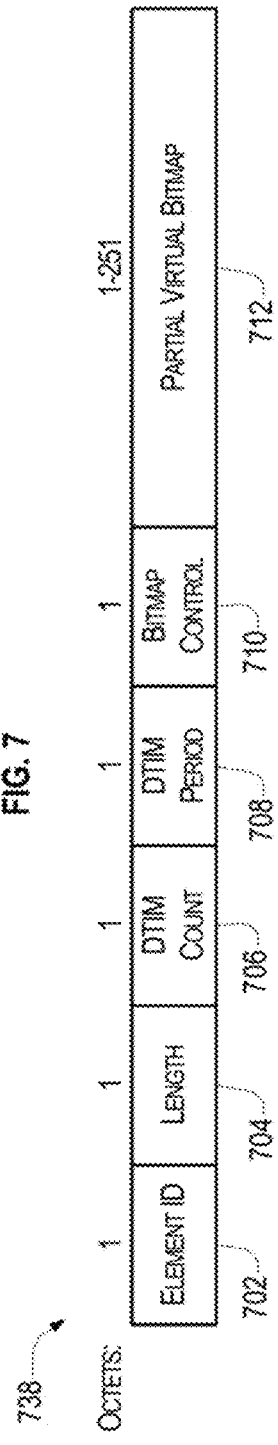
FIG. 7 illustrates a format of a Traffic Information Map (TIM) element suitable for use as a TIM element of a Beacon frame according to an embodiment.

FIG. 7 illustrates a format of a TIM element 738 suitable for use as the TIM element 638 of FIG. 6, according to an embodiment. The TIM element 738 includes an Element ID field 702 having a value of 5 and a Length field 704 indicating the length in octets of the TIM element 738, the length ranging from 6 to 256. The TIM element 738 further includes a DTIM Count field 706, a DTIM Period field 708, a Bitmap Control field 710, and a Partial Virtual Bitmap field 712.

The DTIM Count field 706 that indicates how many beacon frames (including the current one) will appear before the next DTIM. A value of 0 indicates that the current TIM element 738 is a DTIM. The DTIM Period field 708 indicates the number of beacon intervals between successive DTIMs. If all TIMs are DTIMs, the DTIM Period field has a value of 1. The DTIM Period value 0 is reserved.

In the Bitmap Control field 710, the first bit (bit 0) indicates whether buffered multicast/broadcast data exists at the AP. This bit is set to 1 in TIM elements with a value of 0 in the DTIM Count field when one or more group addressed MAC Service Data Units (MSDUs) or MAC Management Protocol Data Units (MMPDUs) are buffered at the AP or at a mesh STA. The remaining 7 bits of the Bitmap Control field 710 form the Bitmap Offset subfield.

The Partial Virtual Bitmap field 712 indicates the STAs for which AP has traffic buffered. In a Beacon frame transmitted by an AP of a BSS, each bit in the virtual bitmap corresponds to traffic buffered for a specific STA within the BSS that the AP is prepared to deliver at the time the Beacon frame is transmitted. In the event that all bits other than bit 0 in the virtual bitmap are 0, the Partial Virtual Bitmap field 712 is encoded as a single octet equal to 0, the Bitmap Offset subfield of the Bitmap Control field 710 is 0, and the Length field 704 is 4.

An AP transmits a TIM in every Beacon frame. In every $n^{th}$ Beacon frame, where n is the value of the DTIM Period field 708, the TIM is transmitted as a DTIM, i.e., a TIM with 0 in the DTIM Count field.

The descriptions of other optional fields of the Beacon frame are omitted.

Because beacon frames are sent using the mandatory IEEE Std 802.11 CSMA/CA algorithm, the AP may wait to send a Beacon frame if another transmission is detected at the time the Beacon frame is to be sent. As a result, the actual time between Beacon frames may be longer than the TBTT, and client devices that awaken from power-save mode may find that they have to wait longer than expected to receive the next Beacon frame. Client devices relying on Beacon frames for timekeeping may compensate for this variation in Beacon frame transmission time by utilizing the timestamp found within the Beacon frames.

The IEEE 802.11 standards define a power-save mode for client devices. In the power-save mode, a client device may choose to sleep for one or more beacon intervals, waking for beacon frames that include DTIMs. For example, when the DTIM count field 706 has a value of 2, a client device in a power-save mode may awaken to receive every other beacon frame.

The IEEE Std 802.11ax has defined a Target Wake Time (TWT) operation to support efficient power consumption in devices such as Internet-of-Things (IoT) devices. A TWT requesting STA communicates wake scheduling information to a TWT responding STA. The TWT responding STA devises a schedule and delivers TWT values according to the schedule to the TWT requesting STA, establishing a named Individual TWT agreement between the two STAs. One of the STAs may be an HE AP. An HE AP can additionally devise schedules and TWT values deliver according to those schedules to HE non-AP STAs, without requiring that an individual TWT agreement be established between them, as a named Broadcast TWT operation.

A STA having a scheduled TWT Service Period (SP) may have to program itself to wake up earlier than the expected time of the TWT SP because of allowed tolerances in the accuracy of a clock used to initiate the wake up. For example, a Transmit center frequency of an IEEE Std 802.11ax device has a specified tolerance of ±20 ppm maximum for 5 GHz band transmissions and ±25 ppm maximum for 2.4 GHz band transmission, while an accuracy of a Time Synchronization Function (TSF) timer must be no worse than ±100 ppm. Even assuming that the ±20 ppm accurate clock used to generate the 5 GHz band Transmit center frequency is also used to operate the TSF timer, because a receiving STA must assume the worst case scenario, the STA may need to wake up substantially earlier than the expected start of the TWT SP in order to guarantee that the STA will be awake at the beginning of the scheduled TWT SP; otherwise the STA might miss a frame transmitted at the scheduled time of the TWT SP. When a long TWT Interval is used (as may often be the case with, for example, battery-powered IoT devices that sleep for long periods), the amount of extra time the STA needs to be awake to compensate for potential clock inaccuracy may substantially increase the STA's average power consumption.

For example, an IoT STA may have a 600 second TWT Wake Interval. Making a worst-case assumptions that the AP TSF timer is faster by 100 ppm and the STA TSF timer is slower by 100 ppm, the drift between the two clocks over the course of 600 seconds may total 120 milliseconds. Therefore, the STA may need to set itself to wake up 120 milliseconds earlier than when the TWT SP is nominally expected to begin according to its TSF timer in order to compensate for the worst case TSF clock drift between the AP and the STA. Given that the actual time to receive the frame transmitted during the scheduled TWT SP may be around one millisecond, waking up and staying awake for 120 milliseconds before that frame may represent a 100× increase in the time spent awake (and therefore up to a 100× increase in the energy expended) during each TWT Wake Interval.

To reduce power consumption of a STA (for example, in Internet of Things (IoT) devices which may run on batteries), the STA should stay in power save mode as much as possible. However, the STA must detect Beacon frames periodically to see whether an AP has buffered traffic for it. Upon receiving the Beacon frame, if the TIM bit in the Beacon frame corresponding to the STA is set to 0, the STA may go into a power save mode after receiving the Beacon frame. A STA may also use a received Beacon frame to compensate for clock drift, especially in STAs (like IoT devices) that may have inexpensive clock circuits.

Even though the Beacon frame is lengthy, except for the Timestamp information and the TIM information, almost all of the information carried in the Beacon frame is likely to be a repeat of information sent in previous Beacon frames. The information is repeated in every Beacon frame to ensure that all STAs associated with the AP receive the information.

Embodiments include STAs that take advantage of the Timestamp information, the TIM information, or both being located in an earlier portion of the Beacon frame, as illustrated in FIG. 6, to reduce power consumption by ending the detection and receiving of the Beacon frame before the end of the Beacon frame after determining, using the TIM information, the Timestamp information, or both, whether to keep awake to detect and receive additional information. The additional information may be information that occurs later in the Beacon frame or information buffered traffic from the AP that will follow the Beacon frame. Ending the detection and receiving of the Beacon frame before the end of the Beacon frame may be termed early termination of the processing of the Beacon frame.

Figure 8:
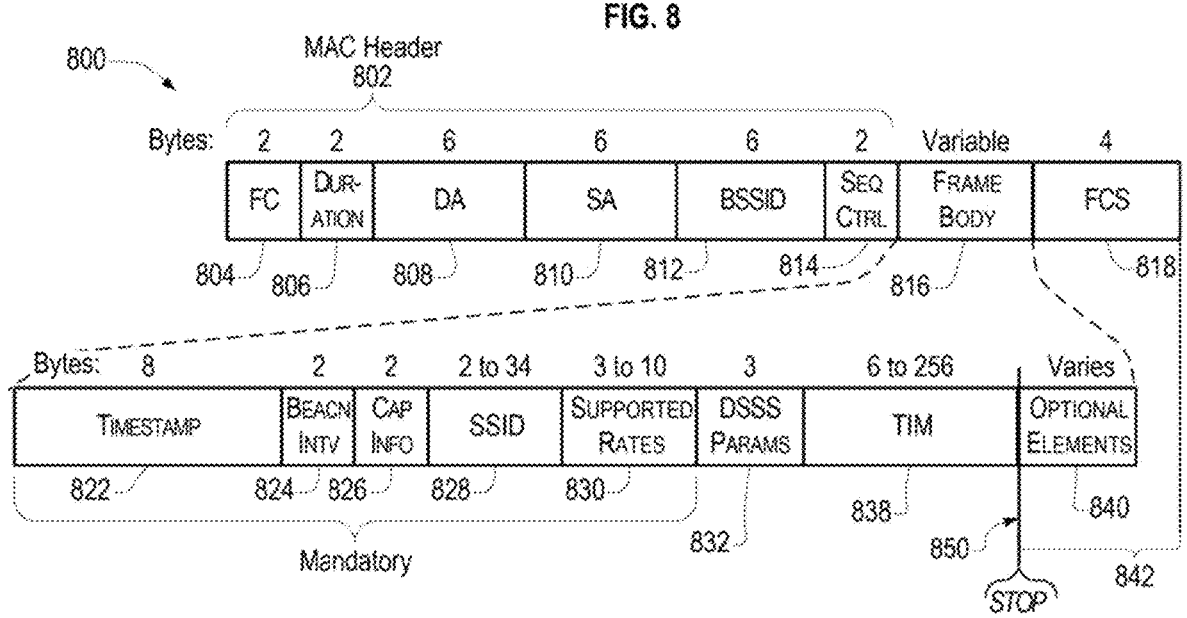
FIG. 8 illustrates early termination of receiving and processing a Beacon frame according to an embodiment.

FIG. 8 illustrates early termination of receiving and processing a Beacon frame 800 according to an embodiment. Elements of FIG. 8 having reference characters of the form "8xx" respectively correspond to elements of FIG. 6 having reference characters of the form "6xx" and descriptions thereof are omitted for brevity. A stopping point 850 indicates an end of processing of the Beacon frame 800, and receiving of the Beacon frame may end at or shortly after the stopping point 850. A remaining portion 842 corresponds to information in the Beacon frame 800 that was transmitted after the stopping point 850. In the example shown, the optional CP parameter Set field and IBSS Parameter Set field are not present.

In an illustrative example wherein fifty STAs are associated with an AP broadcasting the Beacon frame 800, the BSS of the Beacon frame has an SSID element field 828 that is ten bytes long, and the Beacon frame 800 is transmitted using IEEE Std 802.11 Modulation and Coding Scheme (MCS) Index 0 (MCS0, 6.5 Mb/sec), the duration of the Beacon frame up to the stopping point 850 at the end of the TIM element 838 could be around 120 µs. If the typical total duration of the Beacon frame 800 (including the Optional elements 840 and the FCS 818) is 1000 µs and Beacon frames 800 are transmitted every 102.4 milliseconds, a substantial reduction in time spent awake processing Beacon frames 800 (and therefore in power consumption) can be achieved by early termination, according to an embodiment, of the processing of the Beacon frame 800. In the example above, the awake time spent processing Beacon frames would be reduced from 8 milliseconds per second to only 0.8 milliseconds per second, potentially reducing power consumption by a factor of ten.

Regarding the Cyclic Redundancy Check (CRC) in the Frame Check Sequence (FCS) 818, which is used to determine whether the decoded information is correct or not, verification of the CRC may not be necessary because, in order to satisfy the requirements of the process 900, 1000, and 1100 of FIGS. 9, 10, and 11, respectively described below, some specific information in the Beacon frame is very likely to be valid, including the type subfield (2 bits) and subtype subfield (4 bits) of the Frame Control (FC) field 804 and the BSSID field 812 (6 bytes). Given that at least 7 bytes must be recognized as correct information to reach the point in the above-listed processes where the TIM is used, the possibility of corrupted TIM information is ignorable.

Figure 9:
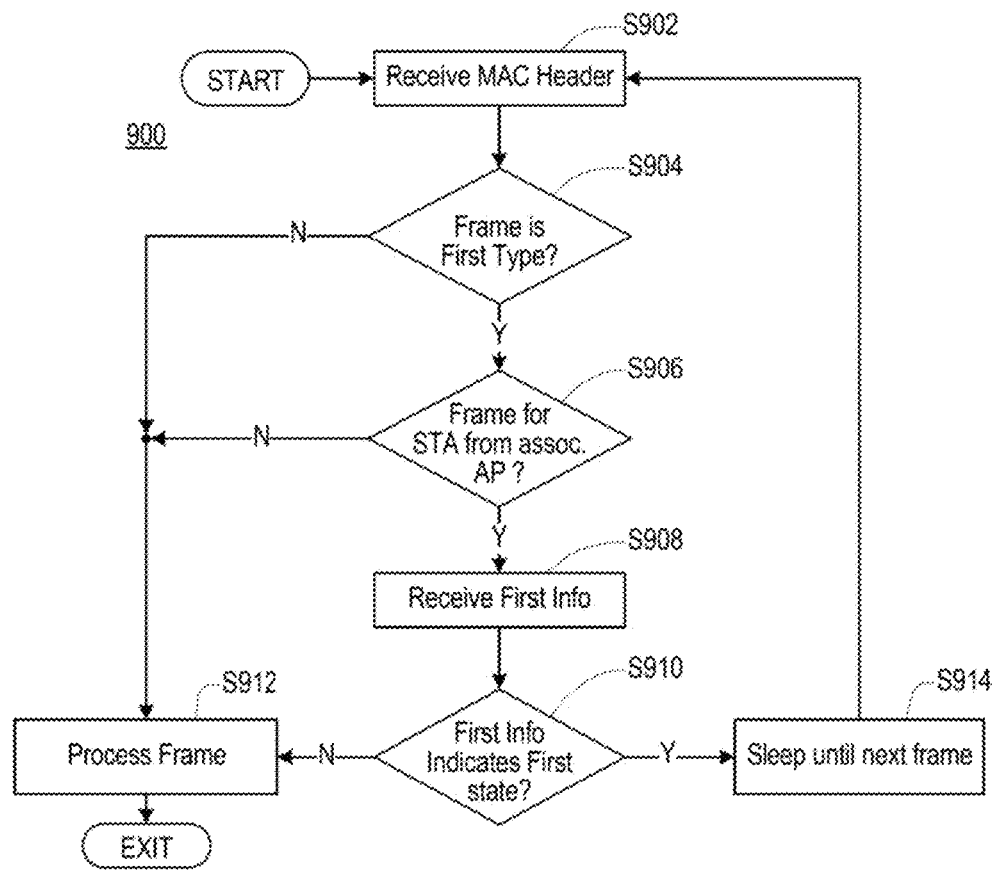
FIG. 9 illustrates a process for receiving and processing a frame according to an embodiment.

FIG. 9 illustrates a process 900, according to an embodiment, for receiving and processing a frame. The process 900 may be performed by a STA in a wireless network, and in particular by a STA waiting for a first type of frame, such as a Beacon frame.

At S902, the process 900 receives a first part of the frame, which in this embodiment is a MAC header of a frame. Receiving the MAC header of the frame may include waking up from a sleep mode (i.e., a power saving mode) at a time slightly before a frame of the first type (e.g., a Beacon frame) is due to arrive, detecting the presence of the frame on the wireless media, and receiving the MAC header of the detected frame. The waking up may be initiated by a timer set by the process 900 before entering the sleep mode. A duration of the timer may be set according to a Beacon Interval and one or both of a DTIM period and a DTIM count, wherein the Beacon Interval, the DTIM period, and/or the DTIM count were indicated in a previously-received Beacon frame.

After S902, the process 900 determines, in S904 and S906 and using the contents of the first part of the frame, whether the frame is a frame of interest to the process 900. A frame of interest is a frame that is a candidate for early termination of its receiving processing.

At S904, the process 900 determines whether the frame is a frame of the first type (e.g., a Beacon frame). Whether the frame is a frame of the first type may be determined using the Frame Control (FC) field of the received MAC header of the frame. In response to the frame being a frame of the first type, at S904 the process 900 proceeds to S906; otherwise, the process 900 proceeds to S912.

At S906, the process 900 determines whether the frame was sent by an AP the STA performing the process 900 is associated with and is intended for the STA. The process 900 may determine whether the frame was sent by an AP the STA is associated with using the BSSID element of the received MAC header of the frame. The process 900 may determine whether the frame is intended for the STA using the Destination address of the received MAC header of the frame. The process 900 may determine that the frame is intended for the STA when the Destination address of the received MAC header includes an address of the STA or a broadcast address indicating a group of one or more STAs including the STA. In response to the frame being sent by the AP the STA performing the process 900 is associated with and being intended for the STA, at S906 the process 900 proceeds to S908; otherwise, the process 900 proceeds to S912.

At S908, the process 900 continues receiving and processing the frame until a first information is received. In an embodiment, the first information corresponds to a TIM element of a Beacon frame. The portion of the frame from the end of the first part (here, the MAC header) to the end of the first information corresponds to a second portion of the frame.

At S910, the process 900 determines whether the first information indicates a first state. In an embodiment wherein the first information is a TIM element, the first state may be that the AP transmitting the frame does not have traffic buffered for the STA performing the process 900. In an embodiment, the first state may be indicated by a bit corresponding to the STA in a TIM element (which may be a DTIM element) of the frame, the bit having a value of 0 to indicate the first state. In response to the first information indicating the first state, at S910 the process 900 proceeds to S914; otherwise, the process 900 proceeds to S912.

At S912, the process 900 receives and processes the frame as appropriate for the type of the frame, whether the frame was from an associated AP and intended for the STA, and the state indicated by the first information.

At S914, the process 900 stops receiving and/or decoding the frame before receiving the entire frame. The portion of the frame not received and/or decoded by the process 900 corresponds to a third portion of the frame. In an embodiment, the third portion may correspond to the remaining portion 842 of the Beacon frame 800 of FIG. 8. The process 900 determines a next time to wake up, and enters a power-saving mode (for example, a sleep mode). The next time to wake up may correspond to an expected time for a frame of the first type, for example, a Beacon frame, to be transmitted from an AP. In an embodiment, the process 900 sets a timer according to the next time to wake up before entering the power-saving mode.

In an embodiment, the next time to wake up may correspond to an expected time for a Beacon frame including a DTIM element to be transmitted from an AP. In an embodiment, the next time to wake up may be determined using one or both of a DTIM count and a DTIM period included in a TIM element of the frame.

In an embodiment, at S914 the process 900 issues a first indication to an RF block of the STA performing the process 900, the first indication directing the RF block to go into an RF power-save mode. The RF block may include a receiver. The first indication may be issued by a MAC layer of the STA. The RF power-save mode may turn off part or all of the RF block. The process 900 may issue the first indication before the end of the frame.

In an embodiment, at S914 the process 900 issues a second indication to a PHY block of the STA performing the process 900, the second indication directing the PHY block to go into a PHY power-save mode. The second indication may be issued by a MAC layer of the STA. The PHY power-save mode may turn off part or all of the PHY block. The process 900 may issue the second indication before the end of the frame.

After entering the power-saving mode, at S914 the process 900 proceeds to S902.

Figure 10:
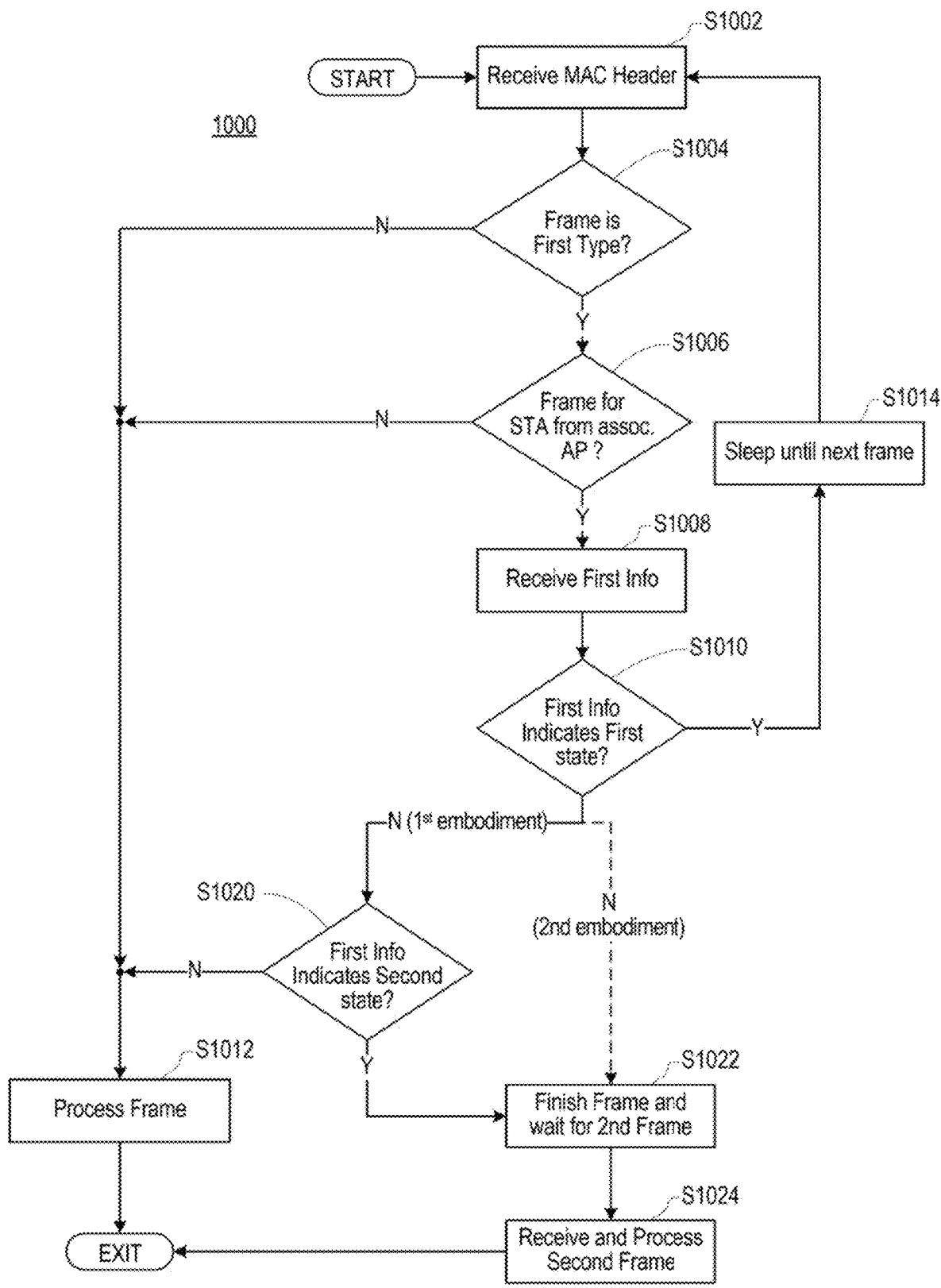
FIG. 10 illustrates a process for receiving and processing a frame according to another embodiment.

FIG. 10 illustrates a process 1000, according to another embodiment, for receiving and processing a frame. The process 1000 may be performed by a STA in a wireless network, and in particular by a STA waiting for a first type of frame, such as a Beacon frame.

At S1002, the process 1000 receives a MAC header of a frame. Receiving the MAC header of the frame may include waking up from a sleep state at a time slightly before a frame of the first type (e.g., a Beacon frame including a DTIM element) is due to arrive, detecting the presence of frame on the wireless media, and receiving the MAC header of the detected frame. The waking up may be initiated by a timer set by the process 1000 before entering the sleep state. A duration of the timer may be set according to a Beacon Interval and one or both of a DTIM period and a DTIM count, wherein the Beacon Interval, the DTIM period and/or a DTIM count were indicated in a previously-received Beacon frame.

Steps S1004, S1006, and S1008 of process 1000 respectively correspond to steps S904, S906, and S908 of the process 900 of FIG. 9 and descriptions thereof are therefore omitted for brevity.

At S1010, the process 1000 determines whether the first information indicates a first state. In an embodiment wherein the first information is a TIM element, the first state may be that the AP transmitting the frame does not have traffic buffered for the STA performing the process 1000. In an embodiment, the first state may be indicated by a bit corresponding to the STA in a TIM element of the frame, the bit having a value of 0 to indicate the first state. In response to the first information indicating the first state, at S1010 the process 1000 proceeds to S1014; otherwise, the process 1000 proceeds to S1020.

At S1012, the process 1000 receives and processes the frame as appropriate for the type of the frame, whether the frame was from an associated AP and intended for the STA, and the state indicated by the first information.

At S1014, the process 1000 stops detecting and decoding the frame, determines a next time to wake up, and enters a power-saving mode (for example, a sleep mode). The next time to wake up may correspond to an expected time for a frame of the first type, for example, a Beacon frame, to be transmitted from an AP. In an embodiment, the process 1000 sets a timer according to the next time to wake up before entering the power-saving mode.

In an embodiment, the next time to wake up may correspond to an expected time for a Beacon frame including a DTIM element to be transmitted from an AP. In an embodiment, the next time to wake up may be determined using a Beacon Interval and one or both of a DTIM period and a DTIM count indicated in the frame.

In an embodiment, at S1014 the process 1000 issues a first indication that an RF block of the STA performing the process 1000, the first indication directing the RF block to go into an RF power-save mode. The first indication may be issued by a MAC layer of the STA. The RF power-save mode may turn off part or all of the RF block.

In an embodiment, at S1014 the process 1000 issues a second indication that PHY block of the STA performing the process 1000, the second indication directing the PHY block to go into a PHY power-save mode. The second indication may be issued by a MAC layer of the STA. The PHY power-save mode may turn off part or all of the PHY block.

After entering the power-saving mode at S1014, the process 1000 proceeds to S1002.

At S1020, the process 1000 determines whether the first information indicates a second state. In an embodiment wherein the first information is a TIM element, the second state may be that the frame is a first frame and the AP transmitting the first frame has a second frame that will be transmitted to the STA performing the process 1000. The second frame may include traffic buffered at the AP and targeted for the STA. In an embodiment, the second state may be indicated by a bit corresponding to the STA in a TIM element of the first frame, the bit having a value of 1 to indicate the second state. In response to the first information indicating the second state, at S1020 the process 1000 proceeds to S1022; otherwise, the process 1000 proceeds to S1012.

In a second embodiment shown in FIG. 10, indicated by a dashed connector, the first information always indicates one of the first state and the second state. In such an embodiment, the process 1000 determining that the first information does not indicate the first state inherently determines that the first information indicates the second state.

Accordingly, in such an embodiment, S1020 is not needed, and at S1010 the process 1000 proceeds to S1022 when the first information does not indicate the first state.

At S1022, the process 1000 finishes detecting and decoding the first frame, then waits for the second frame. When the second frame is detected, the process 1000 proceeds to S1024.

At S1024, the process 1000 detects, receives, decodes, and processes the second frame. In an embodiment, the process 1000 then exits.

Figure 11:
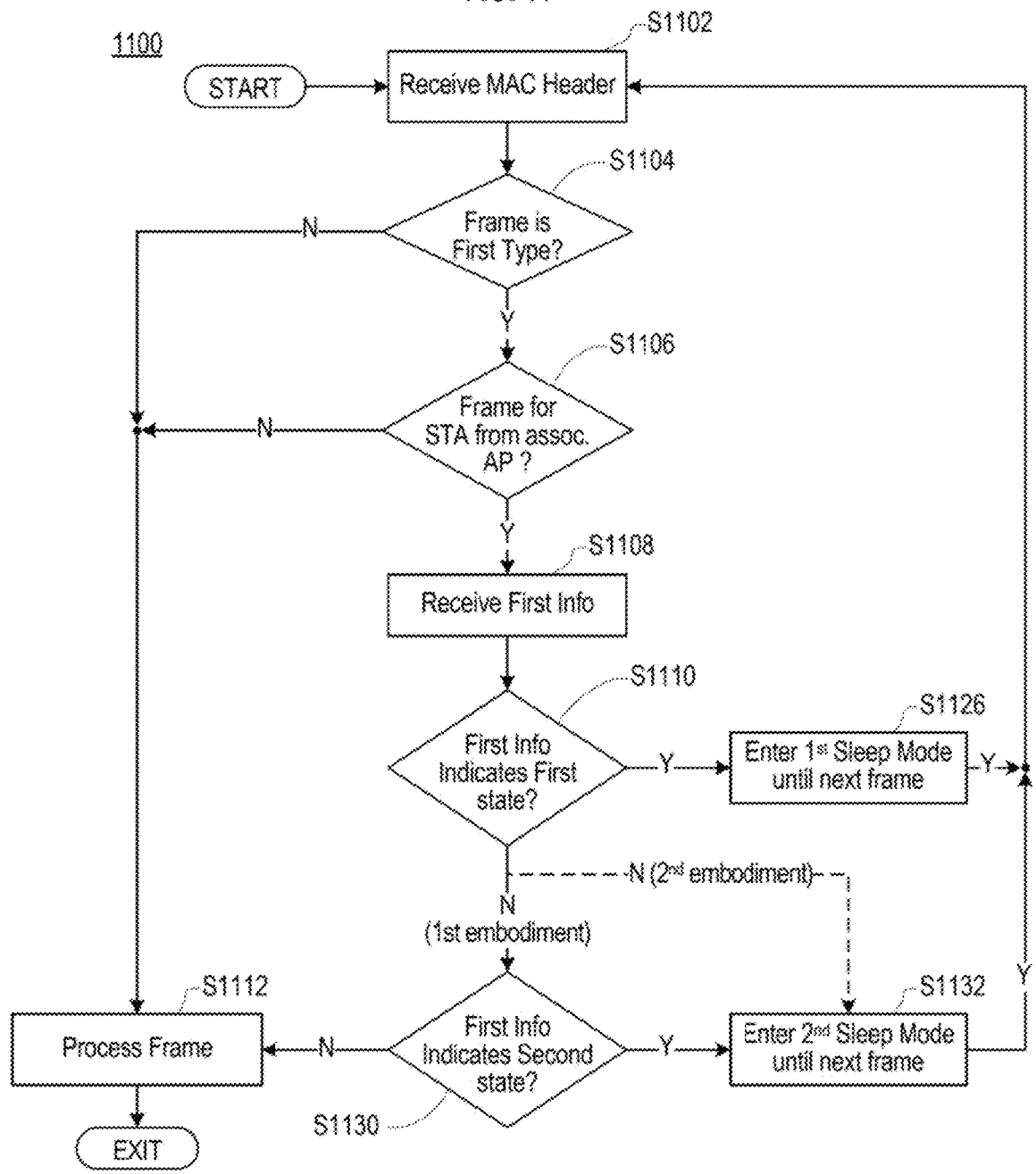
FIG. 11 illustrates a process for receiving and processing a frame according to another embodiment.

FIG. 11 illustrates a process 1100, according to another embodiment, for receiving and processing a frame. The process 1100 may be performed by a STA in a wireless network, and in particular by a STA waiting for a first type of frame, such as a Beacon frame.

Steps S1102, S1104, S1106, and S1108 of the process 1100 respectively correspond to steps S1002, S1004, S1006, and S1008 of the process 1000 of FIG. 10 and descriptions thereof are therefore omitted for brevity.

At S1110, the process 1100 determines whether the first information indicates a first state. In an embodiment wherein the first information is a TIM element, the first state may be that the AP transmitting the frame does not have traffic buffered for the STA performing the process 1100. In an embodiment, the first state may be indicated by a bit corresponding to the STA in a TIM element of the frame, the bit having a value of 0 to indicate the first state. In response to the first information indicating the first state, at S1110 the process 1100 proceeds to S1126; otherwise, the process 1100 proceeds to S1130.

Step S1112 of the process 1100 corresponds to step S1012 of the process 1000 of FIG. 10 and a description thereof is therefore omitted for brevity.

At S1126, the process 1100 stops detecting and decoding the frame, determines a next time to wake up, and enters a first power-saving mode (for example, a deep-sleep mode). The next time to wake up may correspond to an expected time for a next frame of the first type, for example, a Beacon frame, to be transmitted from an AP. In an embodiment, the process 1100 sets a timer according to the next time to wake up before entering the power-saving mode.

In an embodiment, the next time to wake up may correspond to an expected time for a Beacon frame including a DTIM element to be transmitted from an AP. In an embodiment, the next time to wake up may be determined using a Beacon Interval and one or both of a DTIM period and a DTIM count indicated in the frame.

In embodiments, at S1126 the process 1100 issues the indications to the RF block and/or the PHY block of the STA performing the process 1100 as described for S1014 of process 1000 of FIG. 10 above.

After entering the first power-saving mode at S1126, the process 1100 proceeds to S1102.

At S1130, the process 1100 determines whether the first information indicates a second state. In an embodiment wherein the first information is a TIM element, the second state may be that the frame is a first frame and the AP transmitting the first frame has a second frame that will be transmitted to the STA performing the process 1100. The second frame may include traffic buffered at the AP and targeted for the STA. In an embodiment, the second state may be indicated by a bit corresponding to the STA in a TIM element of the first frame, the bit having a value of 1 to indicate the second state. In response to the first information indicating the second state, at S1130 the process 1100 proceeds to S1132; otherwise, the process 1100 proceeds to S1112.

In a second embodiment shown in FIG. 11, indicated by a dashed connector, the first information always indicates one of the first state and the second state. In such an embodiment, the process 1100 determining that the first information does not indicate the first state inherently determines that the first information indicates the second state. Accordingly, in such an embodiment, S1130 is not needed, and at S1110 the process 1100 proceeds to S1132 when the first information does not indicate the first state.

At S1132, the process 1100 stops detecting and decoding the frame, determines a next time to wake up, and enters a second power-saving mode (for example, a shallow-sleep mode). The amount of time needed to transition from the second power-saving mode to an active state may be less than the amount of time needed to transition from the first power-saving mode to the active state. The second power-saving mode may save less power than the first power-saving mode.

In an embodiment, the next time to wake up may correspond to an expected end time of the first frame. In an embodiment, the next time to wake up may correspond to an expected time for the second frame. The second frame may correspond to a data frame including buffered traffic from the AP.

In embodiments, at S1132 the process 1100 issues the indications to the RF block and/or the PHY block of the STA performing the process 1100 as described for S1014 of process 1000 of FIG. 10 above.

After entering the second power-saving mode at S1132, the process 1100 proceeds to S1102.

Figure 12:
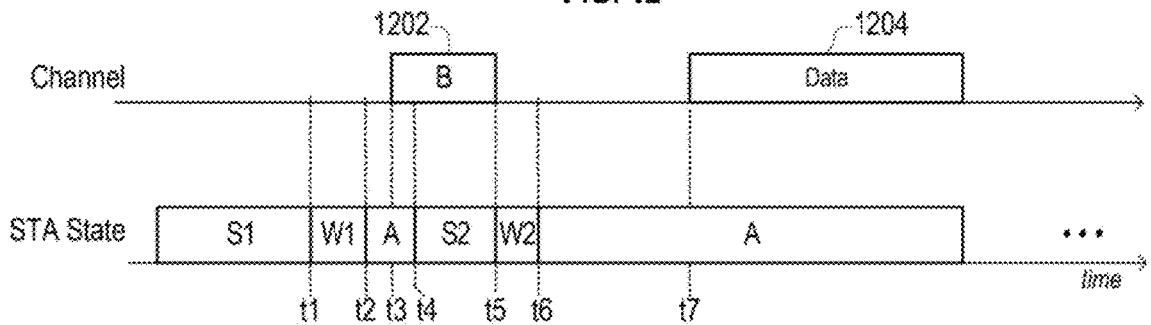
FIG. 12 illustrates power modes of a station (STA) operating according to an embodiment.

FIG. 12 illustrates power modes of a station operating according to the embodiment of FIG. 11. FIG. 12 illustrates a STA receiving a Beacon frame 1202 from a Channel, wherein an information in the Beacon frame 1202 indicates that an AP transmitting the Beacon frame 1202 has traffic buffered for the STA that will be transmitted in a data frame 1204.

Before a first time t1, the STA is in a first sleep state S1. The first sleep state S1 may be a deep sleep state.

At the first time t1, the STA wakes up in anticipation of the transmission of the Beacon Frame 1202. The STA wakes up by performing a first wake up process W1. The first wake up process W1 may be a process specifically for waking up from the first sleep state S1.

At a second time t2, the first wake up process W1 completes and the STA is in the awake state A.

At a third time t3, the STA begins detecting and receiving the Beacon frame 1202. The STA may detect and receive the Beacon frame 1202 as described for S1102 of process 1100 of FIG. 11.

At a fourth time t4, the STA determines that the information in the Beacon frame 1202 indicates that the AP transmitting the Beacon frame 1202 has traffic buffered for the STA that will be transmitted in the data frame 1204, such as described at S1130 of process 1100 of FIG. 11. In response, at the fourth time t4 the STA configures itself to wake up at a time corresponding to the end of the Beacon frame 1202 and then enters the second sleep state S2. The second sleep state S2 may be a shallow sleep state.

At a fifth time t5 corresponding to an end of the Beacon frame 1202, the STA wakes up by performing a second wake up process W2. The second wake up process W2 may be a process specifically for waking up from the second sleep state S2. The second wake up process W2 may take substantially less time to perform than the first wake up process W1.

At a sixth time t6, the second wake up process W2 completes and the STA is in the awake state A.

At a seventh time t7, the STA begins detecting and receiving the data frame 1204.

Unlike the process 1000 of FIG. 10 wherein the STA stays in active mode for duration of the entire Beacon frame when the second state is indicated, the STA performing the process 1100 of FIG. 11 as shown in FIG. 12 goes into a power save mode after the first information indicating the second state is processed and remains in that power save mode to save more power. In an embodiment, the STA remains in that power save mode until a time corresponding to an end of the Beacon frame, which may be a time slightly before the end of the Beacon frame if necessary to provide sufficient time to wake up before the possible arrival of the data frame 1204.

Considering the duration of the Beacon frame, in some implementations it might be difficult to wake up and be ready on time for the next frame from a first (deep sleep) power saving mode. But when the STA supports a second (shallow sleep) power saving mode, the required time to fully wake up from the second power saving mode to detect the next frame could be short enough to perform the process 1100.

In other embodiment wherein the frame is a Beacon frame, the first information may be a Timestamp element. Embodiments wherein the first information is a Timestamp element include processes for keeping a STA clock synchronized with an AP clock during a long sleep period (e.g., a long TWT Wake Interval), such as may be used by battery-powered IoT devices or IoT devices with inexpensive imprecise clock generator circuits.

Figure 13:
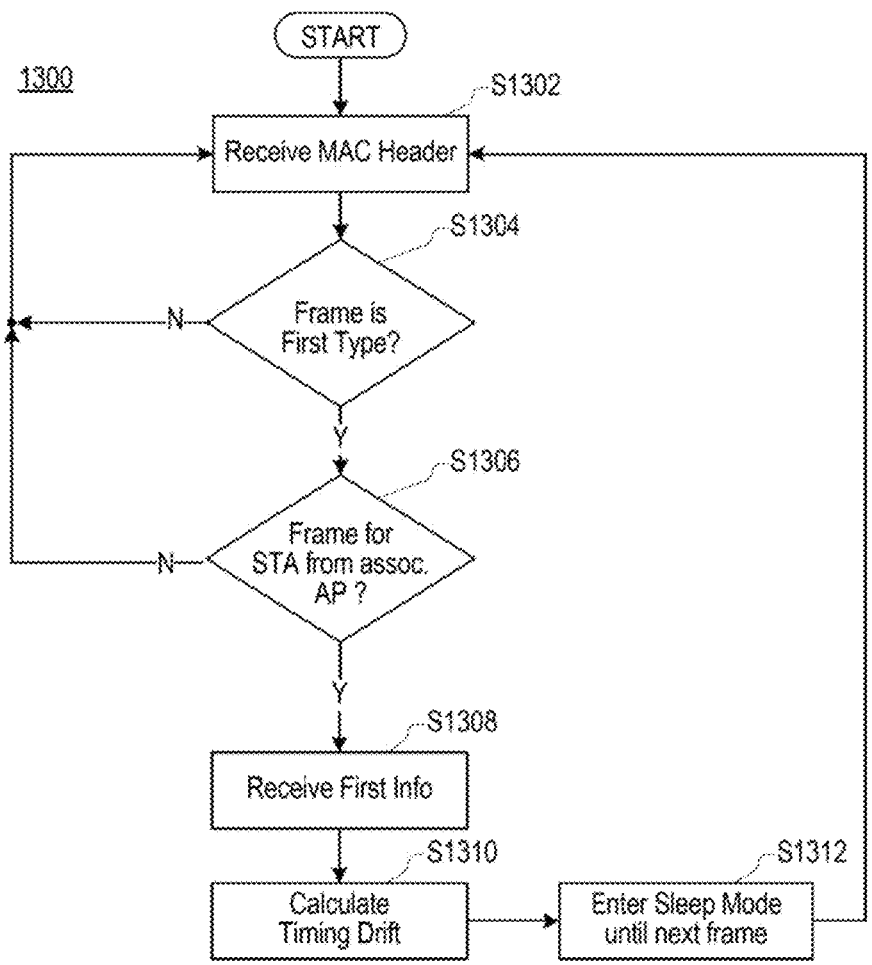
FIG. 13 illustrates a process 1300 for receiving and processing a frame according to another embodiment.

FIG. 13 illustrates a process 1300, according to another embodiment, for receiving and processing a frame. The process 1300 may be performed by a STA in a wireless network, and in particular by a STA waiting for a first type of frame, such as a Beacon frame. Some details of the steps of the process 1300 that are common to them and the step of the process 900 of FIG. 9 are omitted in the interest of brevity.

At S1302, the process 1300 receives a MAC header of a frame. Receiving the MAC header of the frame may include waking up from a sleep state at a time slightly before a frame of the first type (e.g., a Beacon frame) is due to arrive, detecting the presence of frame on the wireless media, and receiving the MAC header of the detected frame. The waking up may be initiated by a timer set by the process 1300 before entering the sleep state. A duration of the timer may be set according to a Beacon Interval and one or both of a DTIM period and a DTIM count.

At S1304, the process 1300 determines whether the frame is a frame of the first type (e.g., a Beacon frame). In response to the frame being a frame of the first type, at S1304 the process 1300 proceeds to S1306; otherwise, the process 1300 proceeds to S1302. In an embodiment, the process 1300 proceeds to S1302 to wait for the next frame of the first type.

At S1306, the process 1300 determines whether the frame was sent by an AP the STA performing the process 1300 is associated with and is intended for the STA. In response to the frame being sent by the AP the STA performing the process 1300 is associated with and being intended for the STA, at S1306 the process 1300 proceeds to S1308; otherwise, the process 1300 proceeds to S1302.

At S1308, the process 1300 continues receiving and processing the frame until a first information is received. In an embodiment, the first info corresponds to a Timestamp element of the frame.

At S1310, the process 1300 stops detecting and decoding the frame, calculates a timing drift using the value of the received Timestamp element, and if a magnitude of the timing drift is not less than a predetermined clock skew tolerance value, corrects an internal clock of the STA performing the process 1300 using the calculated timing drift.

At S1312, the process 1300 determines a next time to wake up, and enters a power-saving mode (for example, a sleep mode). The next time to wake up may correspond to an expected time for a next frame of the first type, for example, a Beacon frame, to be transmitted from an AP. The next time to wake up may correspond to an expected time for a Beacon frame including a DTIM element to be transmitted from the AP. In an embodiment, the process 1300 sets a timer according to the next time to wake up before entering the power-saving mode.

Figure 14:
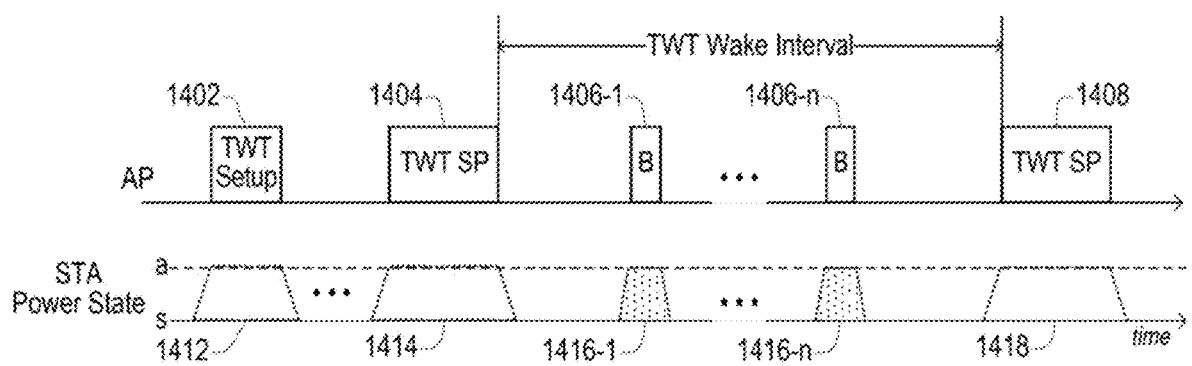
FIG. 14 illustrates operation of a STA according to an embodiment.

FIG. 14 illustrates operation of a STA according to an embodiment. The STA performs a TWT setup with an associated AP and performs the process 1300 of FIG. 13 during a TWT Wake Interval to maintain clock synchronization with the AP. FIG. 14 shows transmissions from the AP and the power state of the STA. The power state of the STA varies between sleeping (s) and active (a).

The STA is required to wake up before each TWT SP to get frames from the AP after a long sleep period (e.g., a TWT Wake Interval). The long sleep period may cause a considerable clock offset to develop between a clock of the AP and a clock of the STA. Unless the STA performs clock resynchronization during the long sleep period, the STA may have to assume the worst case for the clock drift and wake up based on that worst case in order to not to miss the frames of the TWT SP. This may result in the STA waking up substantially earlier that necessary, at the cost of additional power consumption.

In order to ensure an accurate Time Synchronization Function (TSF) timer, the STA may periodically wake up to detect a value in a Timestamp element in a Beacon frame. The Timestamp is generated by the AP using the AP's clock and indicates the time, according to the AP's clock, when the packet was sent out. Receiving the Beacon frames, the STA records their arrival times so that the timestamps can be used to calculate the relative timing drift occurring between the AP and the STA.

During a first TWT active period 1412, the STA performs a TWT Setup with the AP, during which a TWT Wake Interval is established. The TWT Wake Interval may be long enough that the STA may lose clock synchronization with the AP due to clock drift during the TWT Wake Interval. The clock drift may occur because of temperature and/or voltage variations affecting the STA.

During a second TWT active period 1414, the STA wakes up to communicate with the AP during a first TWT Service Period (SP). The STA may configure a TWT timer to wake up the STA for the next TWT SP, which will occur after the TWT Wake Interval. The STA may also configures a clock synchronization timer to perform the process 1300 during the TWT Wake Interval, including configuring the clock synchronization timer to wake up the STA when a first-type frame, such as a later Beacon frame including a DTIM element, is expected. The STA then goes to sleep.

During a first clock synchronization active period 1416-1, the STA wakes up to receive a first first-type frame 1406-1 transmitted before the end of the TWT Wake Interval. The STA performs the process 1300 to maintain clock synchronization, configures itself to wake up for the next appropriate first-type frame, and then goes back to sleep.

Additional clock synchronization active periods may be occur before the end of the TWT Wake Interval, during which the STA performs the process 1300, ending with an $n^{th}$ clock synchronization active period 1416-$n$ during which the STA receives and processes an $n^{th}$ first-type frame.

At the end of the TWT Wake Interval, a third TWT active period 1418 occurs, during which the STA wakes up, as it is required to do, to communicate with the AP during a second TWT SP 1408.

Figure 15:
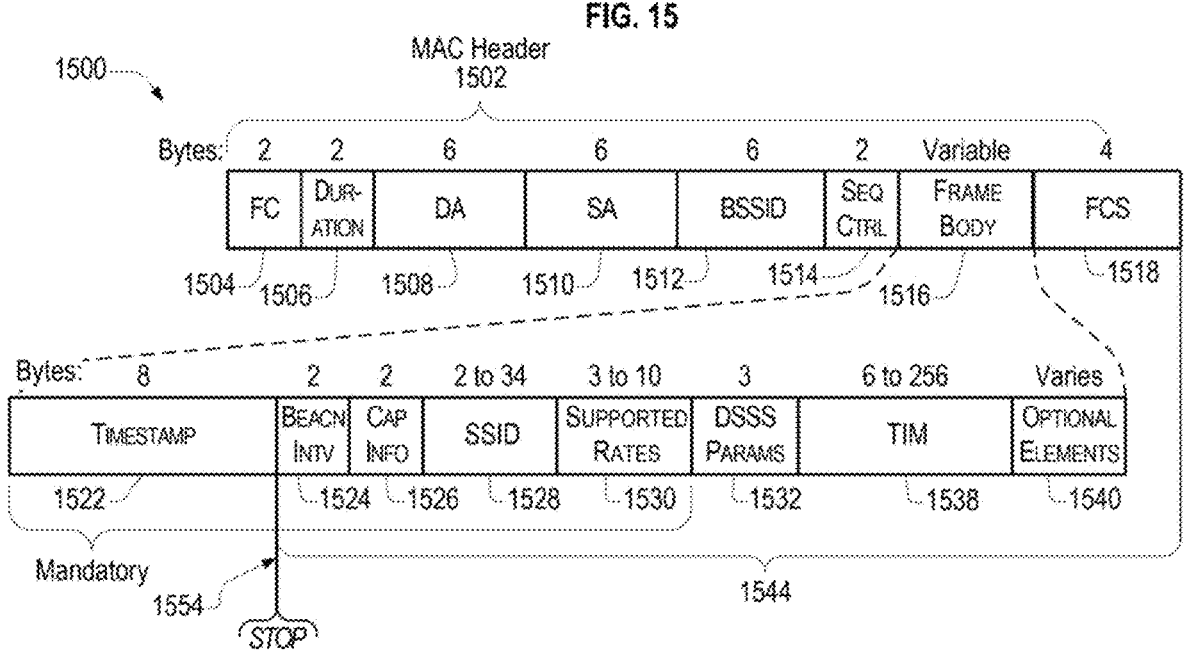
FIG. 15 illustrates early termination of receiving and processing a Beacon frame according to another embodiment.

FIG. 15 illustrates early termination of receiving and processing of a Beacon frame 1500 according to an embodiment. The embodiment may be, for example, the process 1300 of FIG. 13. Elements of FIG. 15 having reference characters of the form "15xx" respectively correspond to elements of FIG. 6 having reference characters of the form "6xx" and descriptions thereof are omitted for brevity. A stopping point 1554 indicates an end of processing of the Beacon frame 1500. A remaining portion 1544 represents information in the Beacon frame 1500 that was transmitted after the stopping point 1554.

If a Beacon frame is received for the sole purpose of maintaining clock synchronization between an AP and a STA for long-sleep IoT devices, then the STA may decode less than the entire packet, as shown in FIG. 15. After decoding up to the Timestamp element, the remaining portion 1544 may be ignored, including any or all of not detecting, not receiving, not decoding, and not interpreting the contents of the remaining portion 1544.

Regarding the Cyclic Redundancy Check (CRC) in the Frame Check Sequence (FCS) 1518, which is used to determine whether the decoded information is correct or not, verification of the CRC may not be necessary because, in order to satisfy the requirements of the process 1300 of FIG. 13, some specific information is very likely to be valid, including the type subfield (2 bits) and subtype subfield (4 bits) of the Frame Control (FC) field 1504 and the BSSID field 1512 (6 bytes). Given that 7 bytes must be recognized as correct information to reach the point in process 1300 where the Timestamp is used, possibility of corrupted Timestamp information is ignorable.

The embodiments described above and illustrated in FIGS. 8-15 do not process information after the first information of a first frame (for example, information after the TIM in FIGS. 8-11 and after the Timestamp in FIGS. 13-15). Some information located after the first information in the first frame may at times be updated by the AP, and a STA may need to receive such updated information in order to operate properly with the AP that the STA is associated with. In order to ensure that the AP receives the updated information in time to prevent unexpected miscommunication between the AP and the STA, the STA may alternately operate in two operation modes:

Mode 1 is herein called a conventional reception mode. It is a mode that the STA receives and checks all entire information of the frame wherein the frame could be the Beacon frame from my BSS.

Mode 2 is herein called an early termination mode. It is a mode that the STA is shown operating in in FIGS. 9-11 and 13.

Figure 16:
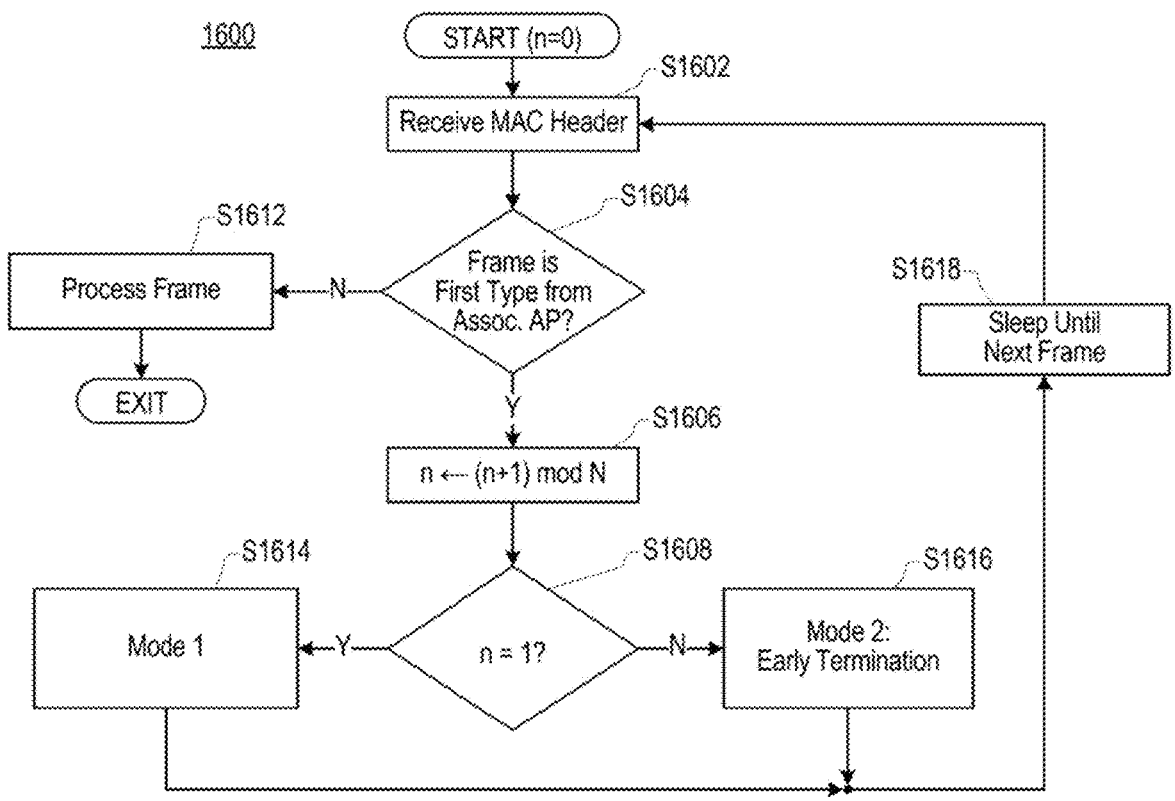
FIG. 16 illustrates a process for operating a STA in two modes according to an embodiment.

FIG. 16 illustrates a process 1600, according to an embodiment, for operating a STA in two modes. In the embodiment, the STA uses a count n to process one out of every N frames in Mode 1 (the conventional reception mode) and process the remaining N−1 frames in Mode 2 (the early termination mode), wherein N is a predetermined integer number.

At S1602, the process 1600 receives a MAC header of a frame. Receiving the MAC header of the frame may include waking up from a sleep state at a time slightly before a frame of the first type (e.g., a Beacon frame) is due to arrive, detecting the presence of frame on the wireless media, and receiving the MAC header of the detected frame. The waking up may be initiated by a timer set by the process 1600 before entering the sleep state. A duration of the timer may be set according to a Beacon Interval and one or both of a DTIM period and a DTIM count, wherein the Beacon Interval, DTIM period and/or a DTIM count were indicated in a previously-received Beacon frame.

At S1604, the process 1600 determines whether the frame is a frame of the first type (e.g., a Beacon frame) from an AP that the STA performing the process 1600 is associated with. In response to the frame being a frame of the first type from the AP the STA is associated with, at S1604 the process 1600 proceeds to S1606; otherwise, the process 1600 proceeds to S1612.

In another embodiment, the process 1600 also determines whether the frame is intended for the STA performing the process 1600. The process 1600 then proceeds to S1606 in response to the frame being a frame of the first type, from the AP the STA is associated with, and intended for the STA; otherwise, the process 1600 proceeds to S1612.

At S1606, the process 1600 increments the count n by one, modulo N, and then proceeds to S1608.

At S1608, the process 1600 proceeds to S1614 in response to determining that the count n is equal to 1, and proceeds to S1616 in response to determining that the count n is not equal to 1. In another embodiment, at S1608 the process 1600 proceeds to S1614 in response to determining that the count n is equal to any of a plurality of predetermined constants less than N, and proceeds to S1616 otherwise.

At S1612, the process 1600 receives and processes the frame as appropriate for the type of the frame, whether the frame was from an associated AP, whether the frame was intended for the STA, and the state indicated by the first information. The process 1600 may then exit depending on the result of processing the frame.

At S1614, the process 1600 receives and process the frame in Mode 1, which may include detecting, receiving, and processing the entirety of the frame including the FCS field.

At S1614 the process 1600 then proceeds to S1618. In an embodiment, the process 1600 may exit in response to the processing of the frame, instead of proceeding to S1618.

At S1616, the process 1600 receives and process some portion of the frame in Mode 2, the early termination made. Processing the frame in Mode 2 may include processing the frame according to portions of one of processes 900, 1000, 1100, and 1300 respectively illustrated in FIGS. 9-11 and 13. At S1616 the process 1600 then proceeds to S1618.

At S1618, the process 1600 determines a next time to wake up and enters a power-saving mode (for example, a sleep mode). The next time to wake up may correspond to an expected time for a frame of the first type, for example, a Beacon frame, to be transmitted from an AP. In an embodiment, the process 1600 sets a timer according to the next time to wake up before entering the power-saving mode.

Figure 17:
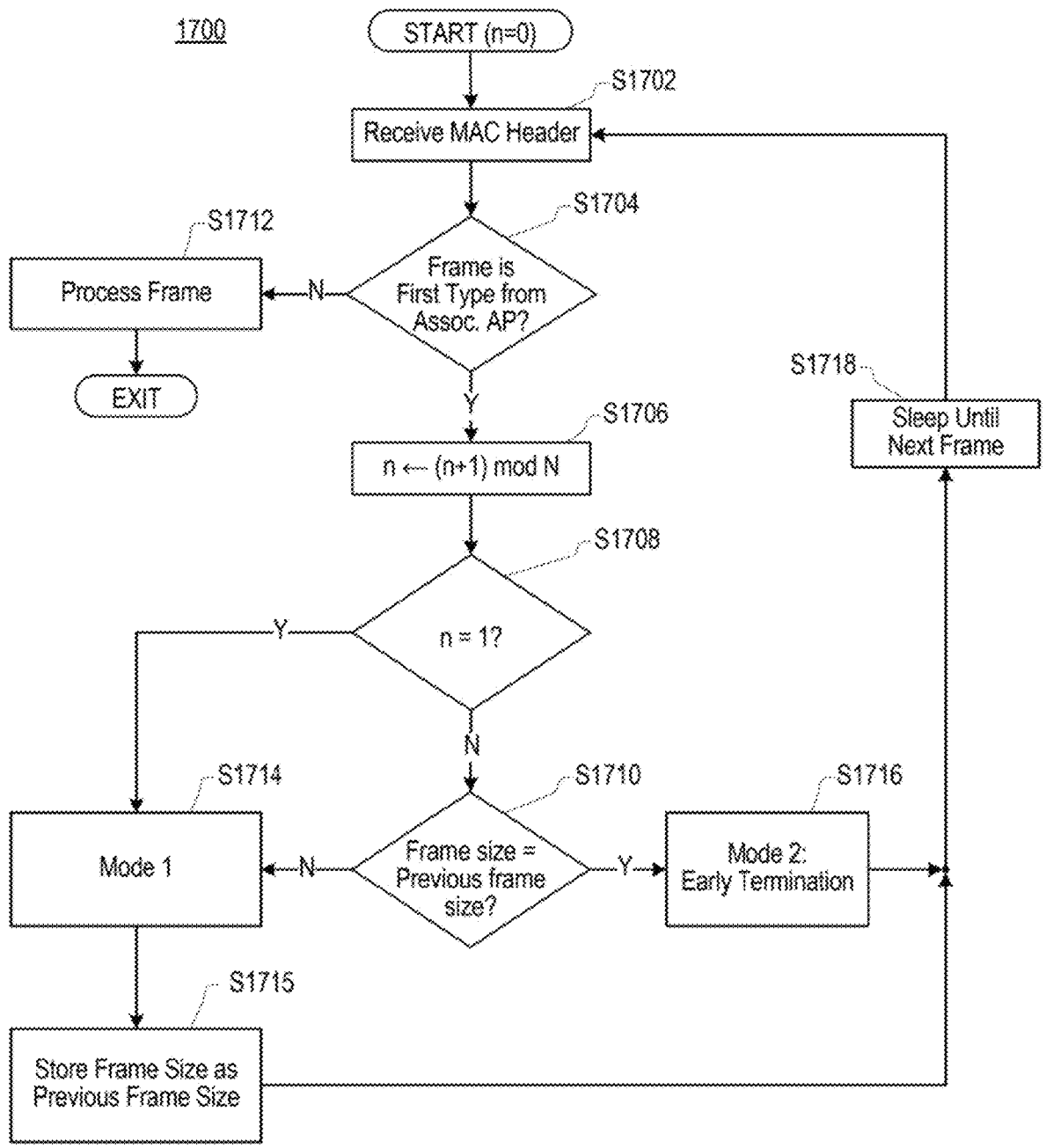
FIG. 17 illustrates a process for operating a STA in two modes according to another embodiment.

FIG. 17 illustrates a process 1700, according to another embodiment, for operation of a STA in two modes. In the embodiment, the STA uses a count n to process one out of every N frames in Mode 1 (the conventional reception mode). Otherwise, the STA process the remaining N−1 frames in Mode 2 (the early termination mode) if they have a frame size that is the same as a previous frame size, and processes them in Mode 1 otherwise. N is a predetermined integer number.

Steps S1702, S1704, S1706, S1712, S1714, S1716, and S1718 of process 1700 respectively correspond to steps S1602, S1604, S1606, S1612, S1614, S1616, and S1618 of the process 1600 of FIG. 16, and descriptions thereof are therefore generally omitted for brevity. However, as shown in FIG. 17, the process 1700 proceeds from S1714 to S1715 instead of proceeding from S1614 to S1618 as the process 1600 does.

At S1708, the process 1700 proceeds to S1714 in response to determining that the count n is equal to 1, and proceeds to S1710 in response to determining that the count n is not equal to 1.

At S1710, the process 1700 determines a size of the frame, and then compares the size of the frame to a previously-stored frame size. The size of the frame may be determined using the Duration field of the MAC header of the frame. At S1710, in response to the size of the frame being equal to the previously stored frame size, the process 1700 proceeds to S1716; otherwise, the process 1700 proceeds to S1714.

At S1714, the process 1700 receives and process the frame in Mode 1, which may include detecting, receiving, and processing the entirety of the frame including the FCS field. At S1714 the process 1700 then proceeds to S1715.

At S1715, because the size of the frame is different than the previously-stored frame size, the process 1700 stores the size of the frame as the previously-stored frame size. The process 1700 then proceeds to S1718.

For example, once in every N (DTIM) Beacon Intervals, a STA operates in Mode 1. Each time the STA receives a Beacon frame from a serving AP, the STA records the size of the received Beacon frame. If the size of the received Beacon frame is different from the saved size of the previously received Beacon frame, the STA operates in Mode 1 because the change in the size indicates that the AP has probably updated some information of the Beacon frame. For other cases, the STA operates in Mode 2.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of another future amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method performed by a wireless device, the method comprising:
   receiving, using a receiver of the wireless device, a first part of a frame;
   determining, using a frame control field included in the first part of the frame, whether the frame is a frame of interest, the frame control field including an indication of a type of the frame, wherein determining that the frame is the frame of interest comprises:
      determining, using the frame control field included in the first part, whether the frame is a frame of a first type; and
      determining, using a Basic Service Set Identifier included in the first part, whether the frame was transmitted by a device in a same Basic Service Set (BSS) as the wireless device,
      wherein the frame is the frame of interest when the frame is a frame of the first type and the frame was transmitted by a device in a same BSS as the wireless device;
   determining, using an address included in the first part of the frame, whether the frame is intended for the wireless device; and
   in response to determining that the frame is the frame of interest and is intended for the wireless device:
      receiving a second part of the frame, the second part occurring after the first part and including a first information,
      determining whether the first information indicates a first state, and
      in response to determining that the first information indicates the first state, placing the wireless device in a sleep state without receiving a third part of the frame, the third part occurring after the second part.

2. The method of claim 1, wherein the first type is a Beacon frame.

3. The method of claim 1, wherein the first type is a Beacon frame including a Delivery Traffic Indication Map.

4. The method of claim 1, wherein the frame is intended for the wireless device when the address included in the first part corresponds to an address of the wireless device or the address included in the first part indicates a group of wireless devices, the group of wireless devices including the wireless device.

5. The method of claim 1, wherein the first information is a Traffic Information Map, and wherein determining whether the first information indicates the first state comprises:
   determining whether the first information indicates that a device that transmitted the frame has traffic buffered for the wireless device; and
   determining that the first information indicates the first state in response to determining that the first information indicates that the device that transmitted the frame does not have traffic buffered for the wireless device.

6. The method of claim 1, wherein placing the wireless device in the sleep state comprises:
   determining an expected time of a transmission of a subsequent frame of the first type;
   configuring, according to the expected time, the wireless device to wake up before the expected time; and
   placing the wireless device in the sleep state.

7. The method of claim 1, wherein the frame is a first frame, the method further comprising:
   in response to determining that the first frame is the frame of interest and determining that the first information does not indicate the first state:
      receiving the rest of the first frame;
      receiving a second frame transmitted after the first frame; and
      placing the wireless device in the sleep state in response to completing the reception of the second frame.

8. The method of claim 1, wherein the sleep state is a first sleep state and the frame is a first frame, the method further comprising:
   in response to determining that the first frame is the frame of interest and determining that the first information does not indicate the first state:
      determining an end time of the first frame;
      placing the wireless device in a second sleep state without receiving a third part of the frame and configuring, according to the end time, the wireless device to wake up at a time corresponding to the end time;
      receiving a second frame transmitted after the first frame; and
      placing the wireless device in the first sleep state in response to completing the reception of the second frame.

9. The method of claim 1, further comprising:
   determining, using the first part of the frame, whether the frame is a frame of a first type;
   incrementing a counter in response to determining that the frame is the frame of the first type; and
   determining whether the value of the counter modulo N corresponds to a predetermined constant, where N is a predetermined number,
   wherein determining whether the frame is the frame of interest comprises:

determining that the frame is the frame of interest when the frame is the frame of the first type and the value of the counter modulo N does not correspond to the predetermined constant, determining that the frame is not the frame of interest in response to the frame not being the frame of the first type, and determining that the frame is not the frame of interest in response to the value of counter modulo N corresponding to the predetermined constant.

10. The method of claim 9, further comprising:

determining, using the first part of the frame, a length of the frame;

producing, using the length of the frame and a previously-stored length, an indication of whether the length of the frame is equal to the previously-stored length; and updating the previously-stored length to be equal to the length of the frame after producing the indication, wherein determining whether the frame is the frame of interest comprises:

determining that the frame is the frame of interest when the frame is the frame of the first type, the value of the counter modulo N does not correspond to the predetermined constant, and the indication indicates that the length of the frame was equal to the previously-stored length, and determining that the frame is the not frame of interest in response to the indication indicates that length of the frame was not equal to the previously-stored length.

11. A method performed by a wireless device, the method comprising:

receiving, using a receiver of the wireless device, a first part of a frame;

determining, using the first part of the frame, whether the frame is a frame of interest; and in response to determining that the frame is the frame of interest:

receiving a second part of the frame, the second part occurring after the first part and including a first information, wherein the first information includes a timestamp, determining a timing drift according to the timestamp, determining whether the first information indicates a first state, including determining that the first information indicates the first state in response to a value of the timing drift having a magnitude less than a predetermined threshold value, in response to determining that the first information indicates the first state, placing the wireless device in a sleep state without receiving a third part of the frame, the third part occurring after the second part, and in response to determining that first information does not indicate the first state, updating a clock of the wireless device according to the timing drift and placing the wireless device in the sleep state without receiving the third part of the frame.

12. The method of claim 11, wherein determining that the frame is the frame of interest comprises:

determining, using a frame control field included in the first part, whether the frame is a frame of a first type;

determining, using a Basic Service Set Identifier included in the first part, whether the frame was transmitted by a device in a same Basic Service Set (BSS) as the wireless device; and determining, using an address included in the first part, whether the frame is intended for the wireless device, wherein the frame is a frame of interest when the frame is a frame of the first type, the frame was transmitted by a device in a same BSS as the wireless device, and the frame is intended for the wireless device.

13. A wireless device, comprising:

a receiver; and a processor, wherein the processor is configured to:

receive, using the receiver, a first part of a frame;

determine, using a frame control field included in the first part of the frame, whether the frame is a frame of interest, the frame control field including an indication of a type of the frame, wherein determining that the frame is the frame of interest comprises:

determining, using the frame control field included in the first part, whether the frame is a frame of a first type; and determining, using a Basic Service Set Identifier included in the first part, whether the frame was transmitted by a device in a same Basic Service Set (BSS) as the wireless device, wherein the frame is the frame of interest when the frame is a frame of the first type and the frame was transmitted by a device in a same BSS as the wireless device;

determine, using an address included in the first part, whether the frame is intended for the wireless device; and in response to determining that the frame is the frame of interest and is intended for the wireless device:

receive a second part of the frame, the second part occurring after the first part and including a first information, determine whether the first information indicates a first state, and in response to determining that the first information indicates the first state, place the wireless device in a sleep state without receiving a third part of the frame, the third part occurring after the second part.

14. The wireless device of claim 13, wherein the first type is a Beacon frame.

15. The wireless device of claim 13, wherein the processor being configured to place the wireless device in the sleep state includes the processor being configured to:

determine an expected time of a transmission of a subsequent frame of the first type;

configure, according to the expected time, the wireless device to wake up before the expected time; and place the wireless device in the sleep state.

16. The wireless device of claim 13, wherein the frame is a first frame, and further comprising the processor configured to:

in response to determining that the first frame is the frame of interest and determining that the first information does not indicate the first state:

receive the rest of the first frame;

receive a second frame transmitted after the first frame; and place the wireless device in the sleep state in response to completing the reception of the second frame.

17. The wireless device of claim 13, wherein the frame is a first frame and the sleep state is a first sleep state, and further comprising the processor configured to:

in response to determining that the first frame is the frame of interest and determining that the first information does not indicate the first state:

determine an end time of the first frame;

place the wireless device in a second sleep state without receiving a third part of the frame and configure, according to the end time, the wireless device to wake up at a time corresponding to the end time;

receive a second frame transmitted after the first frame; and place the wireless device in the first sleep state in response to completing the reception of the second frame.

18. The wireless device of claim 13, further comprising the processor configured to:

determine, using the first part of the frame, whether the frame is a frame of a first type;

increment a counter in response to determining the that frame is the frame of the first type; and determine whether the value of the counter modulo N corresponds to a predetermined constant, where N is a predetermined number;

wherein determining whether the frame is the frame of interest comprises:

determining that the frame is the frame of interest when the frame is the frame of the first type and the value of the counter modulo N does not correspond to the predetermined constant, determining that the frame is not the frame of interest in response to the frame not being the frame of the first type, and determining that the frame is not the frame of interest in response to the value of counter modulo N corresponding to the predetermined constant.

19. The wireless device of claim 18, further comprising the processor configured to:

determine, using the first part of the frame, a length of the frame;

produce, using the length of the frame and a previously-stored length, an indication of whether the length of the frame is equal to the previously-stored length; and update the previously-stored length to be equal to the length of the frame after producing the indication, wherein determining whether the frame is the frame of interest comprises:

determining that the frame is the frame of interest when the frame is the frame of the first type, the value of the counter modulo N does not correspond to the predetermined constant, and the indication indicates that length of the frame was equal to the previously-stored length, and determining that the frame is the not frame of interest in response to the indication indicates that length of the frame was not equal to the previously-stored length.

* * * * *